United States Patent Office 3,605,987
Patented Sept. 20, 1971

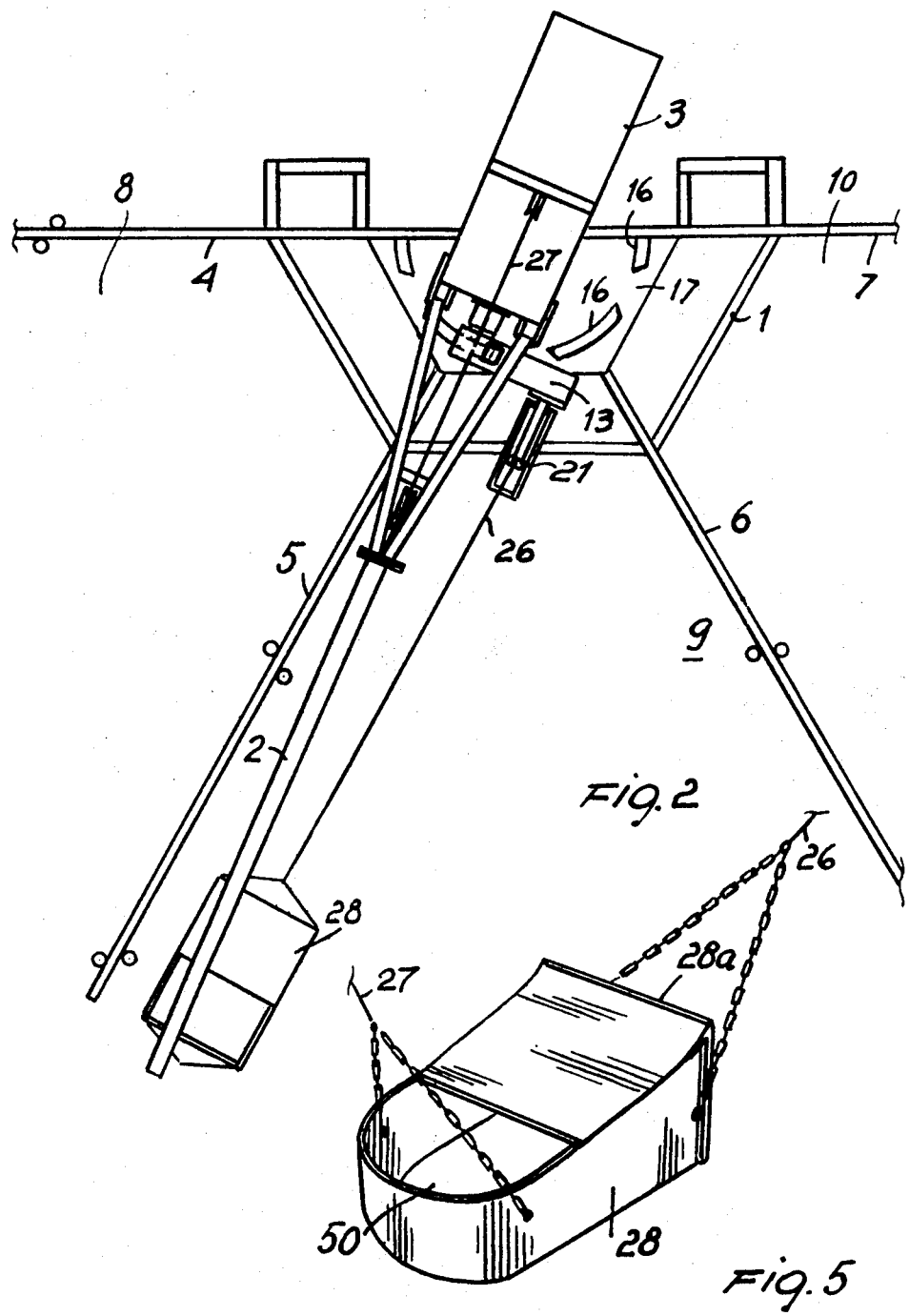

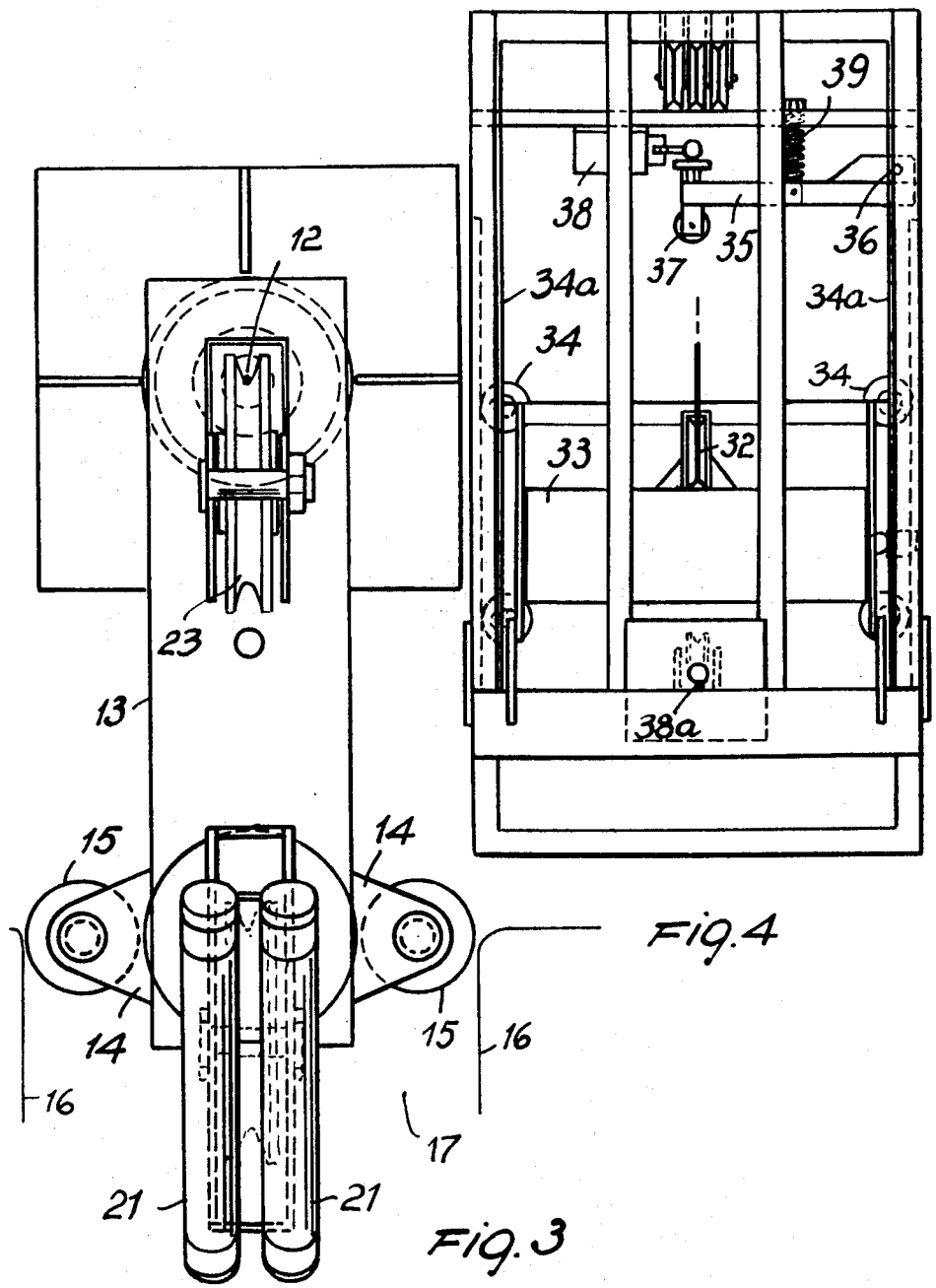

3,605,987
AUTOMATIC APPARATUS FOR CONVEYING LOOSE MATERIALS TO A UTILIZATION STATION
Franco Sigismondo, Via Montevideo 9, Milan, Italy
Filed Sept. 18, 1969, Ser. No. 859,105
Claims priority, application Italy, Sept. 23, 1968, 21,578/68
Int. Cl. B65g 65/28
U.S. Cl. 198—36      7 Claims

ABSTRACT OF THE DISCLOSURE

This disclosure relates to an automatic device for conveying loose material from a plurality of zones around the apparatus and separated by portion walls to a collection zone, said apparatus including a clamshell bucket carried by an arm mounted for rotation on the fixed framework of the apparatus, and cable means for actuating said clamshell bucket, means being provided to cause the clamshell bucket to move substantially parallel to said partition walls when material adjacent these walls is collected.

BACKGROUND OF THE INVENTION

The present invention relates to an automatic apparatus for conveying loose materials to a utilization station.

It is known that for conveying loose inert materials, such as, for example sand, gravel, coal and the like, apparatuses are normally employed comprising clamshell buckets which pick up the material in successive work cycles and form a pile thereof. Very often such apparatus (which usually comprises a support trellis and an arm mounted cantilever-wise on the trellis and supporting the clamshell bucket) necessitates, for its operation, the presence of a skilled operator who controls the various motors of the apparatus so that the apparatus performs the successive steps of each cycle, that is the collection of the material, entrainment of the clamshell bucket, raising of the clamshell bucket and the return of the bucket to its initial position. To these operations there must be added the control operations of the driving unit which causes the rotation of the clamshell bucket support arm about a shaft so that the conveying of the inert material takes place in an area all around the stationary bearing frame. Apparatus has been developed having a high degree of automization but they are not free from disadvantages.

Among the numerous disadvantages of such apparatus a particularly important one arises when it is desired to employ the apparatus for gathering, for example, different loose materials dispersed in adjacent zones which converge in sector-like manner and are separated by partitions, walls or the like. It has been found, in fact, that when apparatus of known type is designed for such use, it is particularly difficult to effect the collection and successive conveying of the material situated adjacent the partition walls. In fact when the clamshell bucket has to entrain the material situated in such zones it strikes, due to the structure of the apparatus, against the partition walls while it is entrained towards the collection zone. Therefore, in order to avoid the sliding of the bucket on the partition walls, and any consequent damage to the bucket or to the walls, it is necessary to have recourse to a complex collection operation which necessitates considerable care and is not very practical, as is well known to experts in this field.

It is also known that the entrainment of the clamshell buckets of the type having closed valves, normally employed in similar apparatus, requires powerful motors which must consequently be constructed to support the overloads which arise during the entrainment of the clamshell bucket filled with material.

The main object of the present invention is that of providing a solution to all the inconveniences indicated above, and still others, by providing an apparatus of the described type which, in particular, permits the clamshell bucket to effect the conveying of materials arranged in zones bounded by walls or partitions in completely automatic manner through a sequence of interventions successively controlled by the clamshell bucket of the apparatus during each operative cycle, even for those portions of material accumulated adjacent the walls, this operation taking place without continual collisions of the clamshell bucket against the walls with the possibility of damage both to the clamshell bucket and to the partition walls.

SUMMARY OF THE INVENTION

According to the invention there is provided an automatic apparatus for conveying loose material from a plurality of separated areas converging towards the apparatus to a collection zone, comprising a fixed framework, an arm mounted on said framework for rotation about a substantially parallel axis, a clamshell bucket from said arm by means of a first cable wound on a rotatable drum driven by a first motor, said clamshell bucket being connected through a second cable to a second rotatable drum driven by a second motor, characterized in that on the trajectory of the arm there are provided means arrangde to maintain said second cable substantially in the same vertical plane as said arm for those angular work positions of the arm distant from partition walls between said areas and arranged to carry the projection of said second cable on a horizontal plane to diverge from the projection of said arm on the same plane for those angular work positions of the arm adjacent said partition walls, which divergence occurs as a rotation inside the free end of the arm, from the side of the arm opposite the partition wall which it is near.

BRIEF DESCRIPTION OF THE DRAWINGS

Further characteristics and advantages of the invention will appear more clearly from the detailed description of a preferred embodiment of the apparatus according to the invention, illustrated by way of example in the accompanying drawings in which:

FIG. 2 is a plan view of the apparatus of FIG. 1, employed for conveying different materials arranged in three different contiguous zones separated by partition walls;

FIG. 3 is a front view of the oscillating unit carried by the clamshell bucket arm, and the relative guides;

FIG. 4 is a front view of a counterweight caisson carried by the rotatable structure of the apparatus, overhanging the fixed framework of the apparatus; and FIG. 5 is a perspective view of the clamshell bucket employed by the apparatus.

DESCRIPTION OF THE PREFERRED EMBODIMENT

Figure 1:
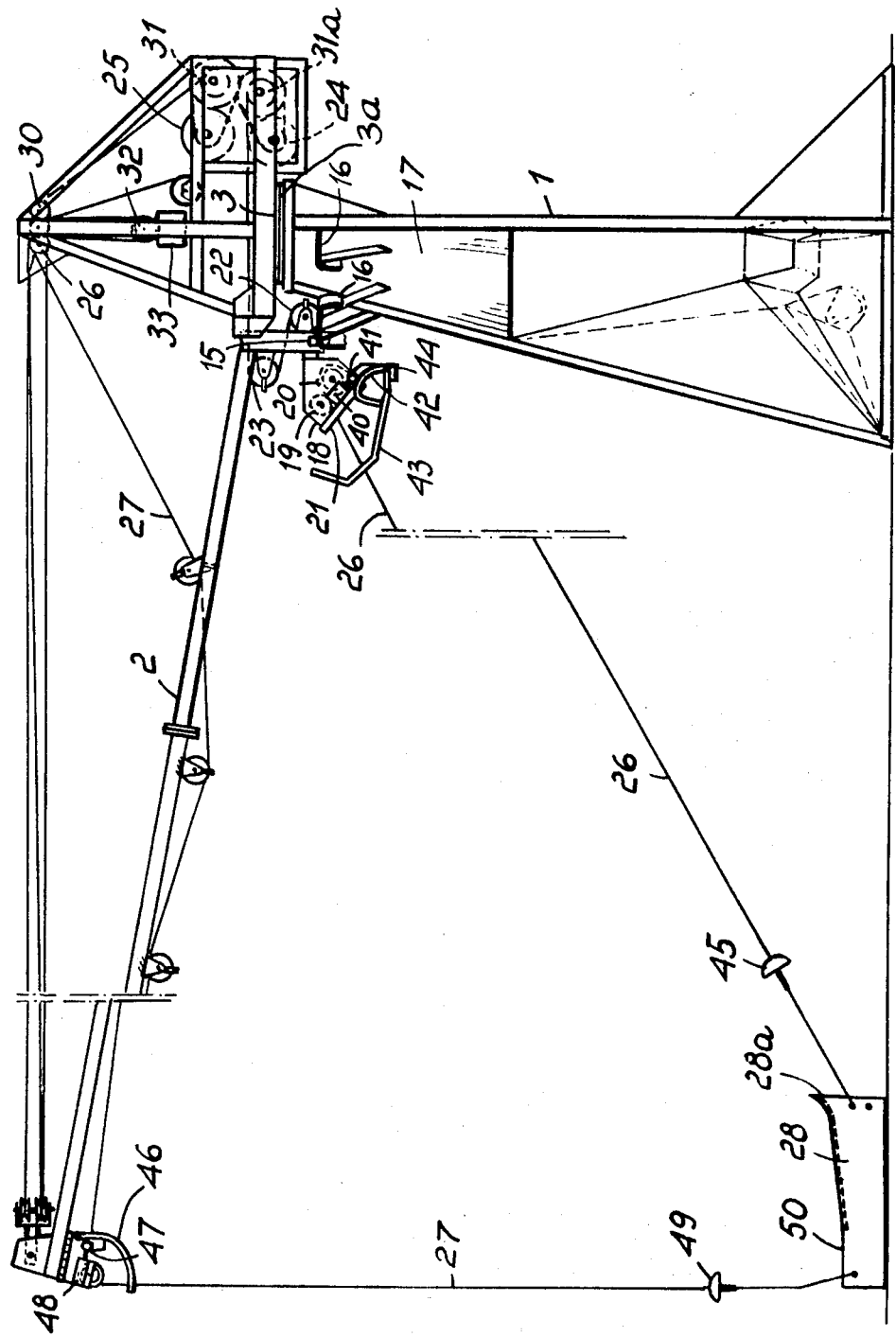
FIG. 1 is a side view of an embodiment of the apparatus according to the invention.

With reference to the drawings, the apparatus according to the embodiment comprises a support frame or tower 1 at the top of which there is pivoted the rotatable unit whose cantilever arm is indicated at 2, while the portion of said unit which overhangs the framework 1 is indicated at 3. The rotatable unit is caused to rotate by a motor (not shown) which transmits the motion to the rotatable pivot 3a. Since it is assumed that the apparatus should gather several types of inert material (in the described example three types), there are provided partition walls or baffles, 4, 5, 6 and 7 defining zones or sectors 8, 9 and 10 which diverge from the apparatus. In each of said zones 8, 9 and 10 there must be gathered a distinct material which is initially dispersed in such zones.

On the structure 3 of the rotatable unit there is mounted a pin 12 which supports a structure or unit 13 which is mounted for oscillation on the pin. The structure 13 extends downward from the point in which the arm 2 is connected to the rotatable unit and is perpendicular thereto. On the lower side portions of the structure 13 there are secured two lugs 14 on which there are rotatably mounted rollers or sliding wheels 15. On the circumferential arc trajectory described by the rollers 15 when the rotatable unit rotates about the fixed framework there are arranged fixed guides 16 comprising four spaced flat U-bent irons disposed along an arc of 180°. In this way along the trajectory of the rollers 15 there are alternate zones occupied by the guides 16 and the apertures 17 between the guides and situated approximately adjacent the centre lines of the sectors 8, 9 and 10. The width of the spaces 17 is such that the rollers 15 may be arranged therein, as indicated in FIG. 3. This means that when the rotatable unit 3 leaves one of the positions in which the rollers 15 are arranged in the empty spaces 17 (centre line of the sectors) the oscillating structure 13 initially inclines about its pin 12 and this is aided by the sliding of at least one of the rollers 15 on the respective guide 16.

On the lower portion of the oscillating support 13, that is below its pin 12, there projects cantilever-wise a support 18 for a pair of parallel rollers 21. On the oscillating structure 13 there are also rotatably supported two transmission pulleys 22 and 23.

The rotatable unit 3 also carries a pair of motors 24 and 25 designed to control the winding and unwinding respectively of a first cable 26 and a second cable 27. The cable 26 is fixed to a clamshell bucket 28 adjacent the loading aperture 28a of the latter. The cable 27 instead supports the clamshell bucket 28 on the opposite side, that is adjacent the bottom of the latter. The cable 26, through the pulleys 22 and 23 is wound on a winch or drum 31a controlled by the motor 24 while the cable 27 is wound on a series of transmission pulleys before being wound on a winch or drum 31 controlled by the motor 25. The cable 27 is also wound on a pulley 32 rotatably mounted on the upper portion of a counterweight 33. The counterweight 33 is guided in its vertical movements by a plurality of rollers 34 arranged for sliding in guides 34a. In the upper portion of its stroke the counterweight engages an arm or bracket 35 pivoted in 36 and carrying at its end a feeler member 37 designed to actuate the motor 24 through a microswitch 38. Between the bracket 35 and the framework which supports it there is interposed a spring 39 whose function will be explained hereinafter. Furthermore, on the plane on which the counterweight 33 comes to rest there is situated a microswitch 38a which controls the cut-out of the motor 25.

On the cantilever support 18 there is arranged a microswitch 40 whose feeler 41 is controlled by a pusher 42 fast with an oscillating arm 43 pivoted in 44. The arm 43 is designed to be urged by a retainer 45 fixed to the cable 26, when the clamshell bucket 28 is entrained by such cable. The microswitch 40 controls the cut-out of the motor 24 and the inversion of the direction of rotation of the motor 25 which causes the winding of the cable 27 on the drum 31.

In analogous manner, at the end of the arm 2 there is pivoted a lever member 46 designed to urge the feeler 47 of a microswitch 48 which, when the lever 46 is stressed by the retainer 49 fixed on the cable 27, controls the cut-out and the inversion of the motor 25, (in the direction corresponding to the winding of the cable 27 on the drum 31) and a horizontal rotation of the arm 2 through an arc programmed by a pre-disposed timer operating on the motor which controls such rotation.

It should be noted that the upper surface of the clamshell bucket 28 is open in its end portion 50, so that when the clamshell bucket is full it tends, during its advance, to settle on the pile instead of sinking therein.

The working of the apparatus according to the embodiment will now be described.

Considering the apparatus starting from the situation illustrated in FIG. 1, it is assumed that the operator has controlled the start of the work cycle. The motor 24 starts to rotate in order to entrain the clamshell bucket by means of the cable 26. At the same time the motor 25 starts to rotate and gives out cable in the sense that the cable 27 unwinds from the drum on which it is wound. While the clamshell bucket 28 is pulled by the motor 24 and approaches the trellis, the cable 27 may tend to slacken because it unwinds more than strictly necessary. In such case the counterweight 33 descends until it acts on the feeler 38a which causes the cutout of the motor 25. In this manner, immediately afterwards, the cable 27, which no longer unwinds, becomes taut once again, the counterweight 33 tends to rise again due to the weight of the clamshell bucket 28, the feeler 38a is freed and the motor 25 rotates to unwind the cable 27 again. In the meantime the motor 24 continues to rotate and the clamshell bucket progressively moves towards the trellis 1 and fills with loose material, the material in the path of the bucket being pushed in front of the latter. Due to the presence of the aperture 50 in the upper portion of the clamshell bucket, the latter is not retained by the resistance of the material since the material which pushes against the loading aperture 28a of the clamshell bucket causes a corresponding ejection of material through the discharge aperture 50 and, consequently, the bucket advances readily without causing the heavy loading of the motor, as occurs in other similar apparatus.

When the clamshell bucket 28 reaches the end portion of its advance, the retainer 45 causes the arm 43 to rotate in clockwise direction (FIG. 1) and cause the actuation of the microswitch 40 which simultaneously stops the motor 24 and inverts the direction of rotation of the motor 25. The cable 27 is thus caused to rewind and, at the same time, the counterweight 33 starts to rise again. When the counterweight 33 comes into contact with the feeler 37, the latter does not act immediately on the microswitch 38 since the spring 39 acts to prevent the raising of the arm 35. However, when the spring 39 is loaded and the arm 35 overcomes the action of the spring to rise further, the microswitch 38 is actuated and acts on the motor 24 which begins to rotate in the opposite direction to its previous rotation and causes the unwinding of the cable 26. As a result of this, the clamshell bucket 28 can be entrained, parallel to the arm 2, towards the end of the latter.

When the retainer 49 pushes the arm 46, the latter causes the cut-out of the motor 24 and the inversion of the motor 25 through the microswitch 48. Besides this, the arm 46 gives a current impulse to a timer which acts on a motor which causes the rotation of the arm 2 with respect to the framework 1 through a prefixed angle which depends upon the setting of said timer. It will therefore be understood that each time the clamshell bucket rises, the arm 46 undergoes an angular displacement so that, with a succession of cycles, all the working area is covered by the bucket 28 during its movements.

The rotation of the motor 25 causes, finally, the clamshell bucket 28 to rest on the ground, and consequently, the cable 27 slackens, the counterweight 33 descends, and the microswitch 38a stops the motor 25. When the clamshell bucket 28 touches the ground a control (not shown) starts the motor to cause the winding of the cable 26, thus a new cycle begins.

It should be noted that when the arm 2 works adjacent the partition walls 4, 5, 6 and 7 the traction on the clamshell bucket exercised by the cable 26 has a line of action whose projection in a horizontal plane does not coincide with that in which the arm 2 extends. Dut to this, when it is necessary to move loose material, situated inside the zones 8, 9 and 10 adjacent the partition walls, towards the base of the apparatus, the clamshell bucket 28 begins its movement immediately adjacent such walls, but during its successive movement when it entrains the material it does not strike against these walls but, instead, remains parallel to the walls and, at most, it will describe a trajectory which is only slightly unparallel to the walls. This is contrary to what takes place with apparatus of conventional type. This result is achieved in the following manner:

When the apparatus works in the zone of the centre line of each of the sectors 8, 9 and 10, the arrangement of the oscillating unit 13 is that shown in FIG. 1. When the apparatus moves away from this intermediate position, the rotation of the arm 2 is followed by the unit 13 which inclines about the pin 12 in the opposite direction to that of the rotation while one of the rollers 15 follows the profile of the guides 16 on the side towards which the rotation of the arm 2 occurs.

The unit 13 is thus maintained inclined throughout the period in which the apparatus works in the zone comprised between the bisectors of two contiguous sectors, and it reassumes the arrangement shown in FIG. 1 when it reaches another empty space 17.

Naturally, instead of two support rollers 15 for the oscillating unit 13, other equivalent means may be provided, such as, for example, a single roller arranged behind said unit 13.

Various modifications and variations may be effected within the scope of the appended claims. Thus, for example, it is possible to obtain the divergence of the cable 26 from the arm 2 by means of an arrangement of rods pivoted on the arm 2 and actuated by the rotation of the arm, for example by means of the interaction of one of these rods with cam members or with a suitably shaped guide.

I claim:

1. An automatic apparatus for conveying loose material from a plurality of separated areas converging towards the apparatus to a collection zone, comprising a fixed framework, an arm mounted on said framework for rotation about a substantially parallel axis, a clamshell bucket from said arm by means of a first cable wound on a rotatable drum driven by a first motor, said clamshell bucket being connected through a second cable to a second rotatable drum driven by a second motor, characterized in that on the trajectory of the arm there are provided means arranged to maintain said second cable substantially in the same vertical plane as said arm for those angular work positions of the arm distant from partition walls between said areas and arranged to carry the projection of said second cable on a horizontal plane so to diverge from the projection of said arm on the same plane for those angular work positions of the arm adjacent said partition walls, which divergence occurs as a rotation inside the free end of the arm, from the side of the arm opposite the partition wall which it is near.

2. An apparatus as claimed in claim 1, comprising a fixed framework, a rotable arm on said framework for rotation about a practically vertical axis, a clamshell bucket suspended from said arm with a first cable wound on a drum controlled by a first motor and connected through a second cable to a second rotatable drum controlled by a second motor, characterized by the fact that on said rotatable arm, adjacent said framework, a unit is pivoted about a substantially horizontal shaft provided, at a certain distance from the axis about which it is pivoted, with transmission means on which said second cable passes; guides being provided for said unit on the trajectory of the latter during its rotary movement fast with the arm, said guides having a shape which is periodically repeated in each of the converging collection areas and such that said oscillating unit slides on said guides maintaining said second cable substantially aligned with said arm in those positions of the arm in which the clamshell bucket conveys the material situated at a distance from the partition walls between the various adjacent areas and inclines so as to carry said second arm to diverge from said arm in those positions of the arm in which the clamshell bucket works on the material situated adjacent said partition walls.

3. An apparatus as claimed in claim 1, characterized in that said guides for the oscillating unit have, adjacent the central zone of each of said separated areas, discontinuities or depressions, and said unit is provided with means for sliding on said guides and arranged to be situated in said depressions when the arm of the apparatus carries the clamshell bucket to work on the material arranged in the central zones of said areas, said means being such as to firstly constitute a fulcrum for said unit when said arm leaves said central zones, so that said unit inclines, and then said means slide on said guides maintaining the unit inclined until a new discontinuity of the guide is reached.

4. An apparatus as clamed in claim 2, characterized in that said guide comprises a succession of U-shaped portions arranged along the arc along which said unit travels, said discontinuities being defined between said U-shaped portions.

5. An apparatus as claimed in claim 1, characterized in that said clamshell bucket is upwardly closed only for a certain portion by a wall which does not extend to the rear portion of the clamshell bucket, so that the interior of the latter communicates at the top with the outside adjacent said rear portion of the clamshell bucket.

6. An apparatus as claimed in claim 1, characterized in that said first cable is wound on a pulley on which there is suspended a counterweight which is mobile between an upper position in which it activates a control for the inversion of the direction of rotation of said first motor, and a lower position in which it actuates a further control for stopping said first motor.

7. An apparatus as claimed in claim 1, characterized in that said unit is provided with at least one roller slidably mounted on said guides and arranged to be inserted inside said discontinuities of the guides when the clamshell bucket works at a distance from said partition walls.

References Cited

UNITED STATES PATENTS

| | | | |
|---|---|---|---|
| 2,609,621 | 9/1952 | Babin | 37—116 |
| 3,488,036 | 1/1970 | Feger et al. | 37—116X |
| 3,495,723 | 2/1970 | Reymann et al. | 214—10 |

GERALD M. FORLENZA, Primary Examiner

F. E. WERNER, Assistant Examiner

U.S. Cl. X.R.

37—116; 214—10